United States Patent
Koo et al.

(10) Patent No.: US 8,094,815 B2
(45) Date of Patent: Jan. 10, 2012

(54) ARITHMETIC METHOD AND APPARATUS FOR SUPPORTING AES AND ARIA ENCRYPTION/DECRYPTION FUNCTIONS

(75) Inventors: Bon Seok Koo, Daejeon (KR); Gwon Ho Ryu, Daejeon (KR); Sang Woon Yang, Daejeon (KR); Tae Joo Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1077 days.

(21) Appl. No.: 11/923,806

(22) Filed: Oct. 25, 2007

(65) Prior Publication Data

US 2008/0112560 A1 May 15, 2008

(30) Foreign Application Priority Data

Nov. 13, 2006 (KR) .................. 10-2006-0111856
May 14, 2007 (KR) .................. 10-2007-0046526

(51) Int. Cl.
*H04K 1/00* (2006.01)
*H04L 9/00* (2006.01)
(52) U.S. Cl. ............................................. 380/29
(58) Field of Classification Search .......... 380/29, 380/37
See application file for complete search history.

(56) References Cited

U.S. PATENT DOCUMENTS

2005/0169463 A1* 8/2005 Ahn et al. ............... 380/28
2008/0112560 A1* 5/2008 Koo et al. ............... 380/29

FOREIGN PATENT DOCUMENTS

KR  1020050095168  * 9/2005

OTHER PUBLICATIONS

Kwon, et al. New Block Cipher: ARIA. 2004. pp. 432-445. J.I. Lim and D.H. Lee (Eds): ICISC 2003, LNCS 2971, pp. 432-445, 2004.*
Akashi Satoh, et al; "A Compact Rijndael Hardware Architecture with S-Box Optimization", In Proceedings: ASIACRYPT 2001, LNCS 2248, pp. 239-254, 2001 (Exact Date not Given).

* cited by examiner

*Primary Examiner* — Jason Gee
(74) *Attorney, Agent, or Firm* — Ladas & Parry LLP

(57) ABSTRACT

Provided are an arithmetic method and apparatus for supporting Advanced Encryption Standard (AES) and Academy, Research Institute and Agency (ARIA) encryption/decryption functions. The apparatus includes: a key scheduler for generating a round key using an input key; and a round function calculator for generating encrypted/decrypted data using input data and the round key. Here, the round function calculator includes an integrated substitution layer and an integrated diffusion layer capable of performing both AES and ARIA algorithms.

5 Claims, 5 Drawing Sheets

ARITHMETIC METHOD AND APPARATUS FOR SUPPORTING AES AND ARIA ENCRYPTION/DECRYPTION FUNCTIONS

CROSS-REFERENCE TO RELATED APPLICATION

This application claims priority to and the benefit of Korean Patent Application Nos. 2006-111856, filed Nov. 13, 2006, and 2007-46526, filed May 14, 2007, the disclosures of which are incorporated herein by reference in their entirety.

BACKGROUND

1. Field of the Invention

The present invention relates to an arithmetic method and apparatus for supporting Advanced Encryption Standard (AES) and Academy, Research Institute and Agency (ARIA) encryption/decryption functions.

2. Discussion of Related Art

An AES block encryption algorithm was selected as an American standard by the National Institute of Standards and Technology (NIST) of the United States in 2001. In addition, an ARIA block encryption algorithm was selected as a Korean Industrial Standard. The two domestic and foreign standard block encryption algorithms, i.e., the AES and ARIA algorithms, are widely used in various encryption fields, such as smart cards, electronic passports, server-level encryption equipment, and so on.

Most encryption operations take a long time to complete and thus are implemented in hardware. In the early stages of AES or ARIA hardware implementation, research comparing and analyzing performance of the hardware according to high-performance implementation techniques or methods was generally conducted. However, with the gradual development of wireless technology, such as cellular phones and Radio Frequency Identification (RFID), research on miniaturization and implementation of low power consumption has been conducted recently.

Research on an encryption operation apparatus having integrated hardware supporting at least 2 encryption algorithms is less active than research on an arithmetic apparatus for a single encryption algorithm. This is because, when compared to software implementation, hardware implementation generally requires twice as many resources to implement 2 algorithms. However, as illustrated in FIGS. 1 and 2, the AES and ARIA algorithms use round functions having the similar Substitution Permutation Network (SPN) structure, thus having many common features. First, in an S-box operation, which is a basic operation of a substitution layer, the 2 algorithms use the same finite field $GF(2^8)$. In addition, from a scalar multiplication matrix operation used in a diffusion layer, it is possible to extract terms used in common by the two algorithms.

SUMMARY OF THE INVENTION

The present invention is directed to an arithmetic method and apparatus of integrated hardware supporting both Advanced Encryption Standard (AES) and Academy, Research Institute and Agency (ARIA) functions using a hardware resource sharing method for common factors between AES and ARIA algorithms.

One aspect of the present invention provides an arithmetic method of supporting AES and ARIA encryption/decryption functions, the method comprising the steps of: receiving input data and a round key; performing an S-box operation used in common in AES and ARIA algorithms using the input data and the round key; and extracting common terms used in a diffusion function of the AES and ARIA algorithms using the data on which the S-box operation is performed, and performing a diffusion operation.

Another aspect of the present invention provides an integrated arithmetic apparatus for supporting AES and ARIA encryption/decryption functions, the apparatus comprising: a key scheduler for generating a round key using an input key; and a round function calculator for generating encrypted/decrypted data using input data and the round key. Here, the round function calculator includes an integrated substitution layer and an integrated diffusion layer capable of performing both AES and ARIA algorithms.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

In this specification, currently used general terminology is mostly employed, but other terminology that has been selected for the present invention by the applicant himself/herself is also employed. In this case, the meaning of the terminology selected by the applicant is mentioned in the corresponding detailed description, and thus the present invention should be understood using the meanings provided in the detailed description, as opposed to their general meaning.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
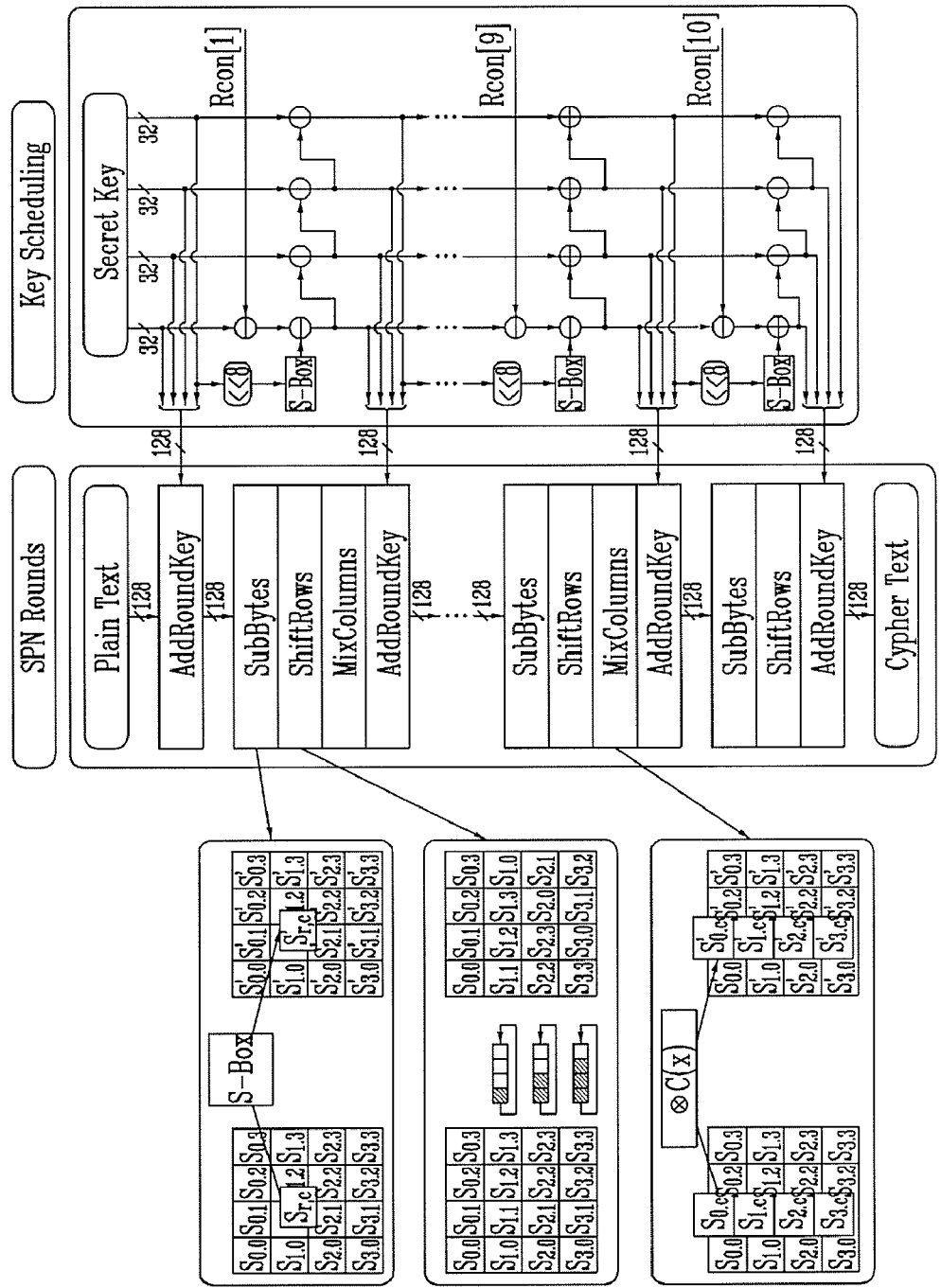
FIG. 1 illustrates an encryption process of an Advanced Encryption Standard (AES) algorithm.
Figure 2:
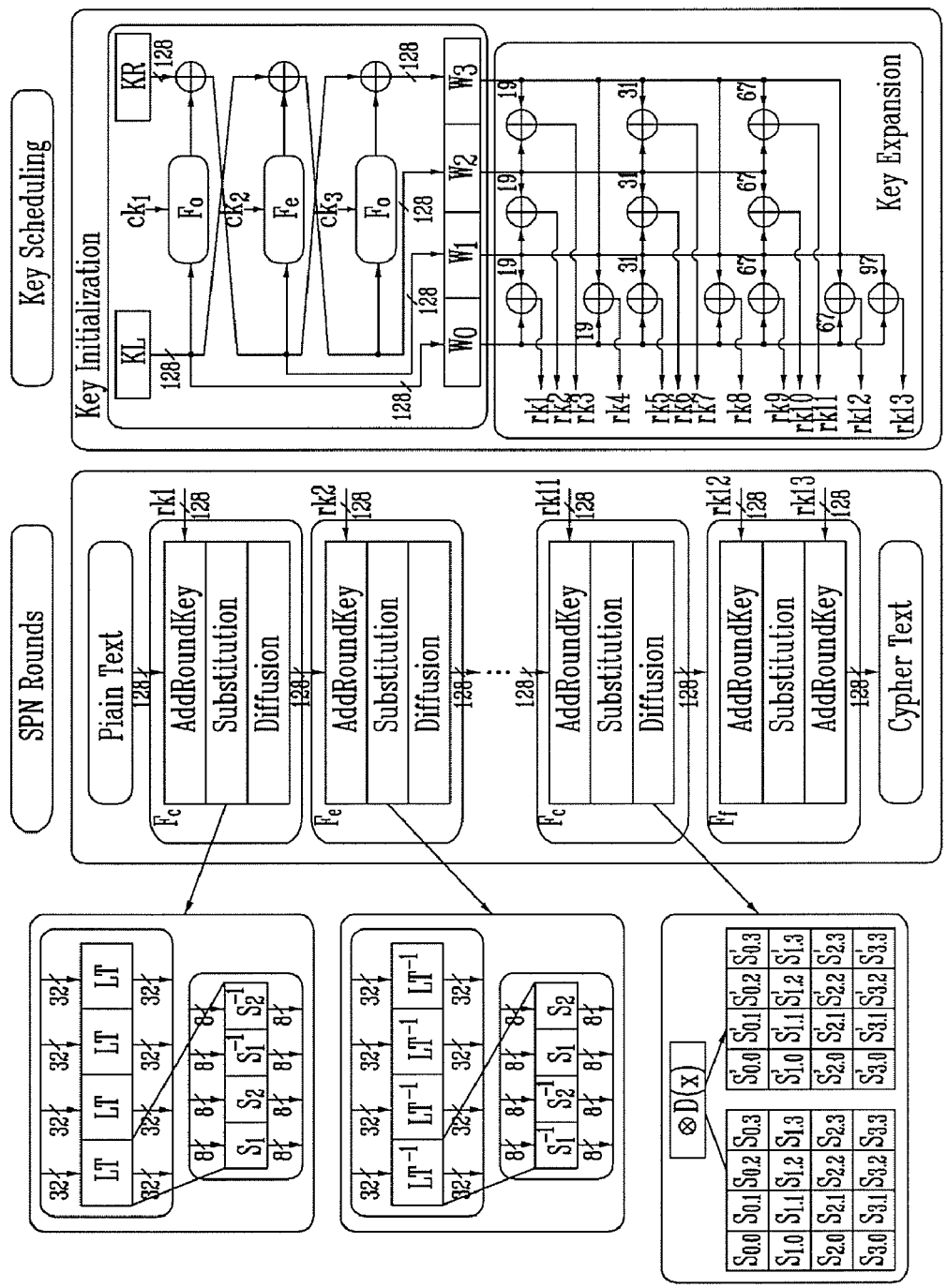
FIG. 2 illustrates an encryption process of an Academy, Research Institute and Agency (ARIA) algorithm.
Figure 3:
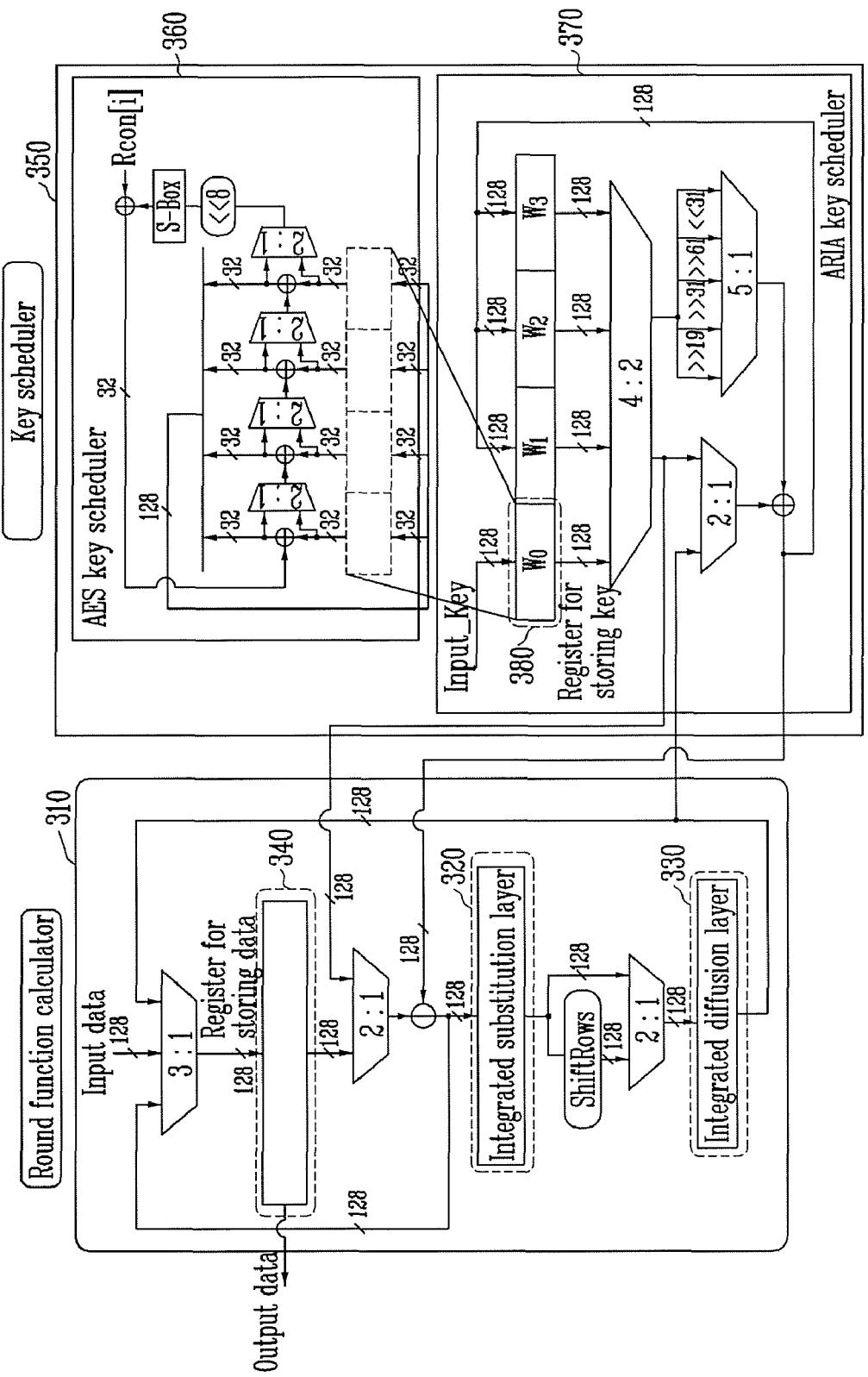
FIG. 3 is a block diagram of an arithmetic apparatus having AES and ARIA-integrated hardware according to an exemplary embodiment of the present invention.

FIG. 3 is a block diagram of an apparatus having Advanced Encryption Standard (AES) and Academy, Research Institute and Agency (ARIA)-integrated hardware according to an exemplary embodiment of the present invention. The apparatus having AES and ARIA-integrated hardware comprises a round function calculator 310 and a key scheduler 350. The round function calculator 310 performs one round operation, and includes: an integrated substitution layer 320 for performing an S-box operation used in common for AES and ARIA algorithms using input data and a round key input from the key scheduler 350; an integrated diffusion layer 330 for performing a diffusion operation used in a diffusion function of the AES and ARIA algorithms using the operation result of the integrated substitution layer 320; a register 340 for storing 128-bit data; and a multiplexer (MUX) for selecting a data path.

The key scheduler 350 includes an AES key scheduler block 360 and an ARIA key scheduler block 370, and can calculate a round key required for each round by an on-the-fly method. Here, to economize hardware resources, a 128-bit register $W_0$ 380, which is one of round key storages in the ARIA key scheduler block 370, may be also used as a register for storing an AES round key.

Figure 4:
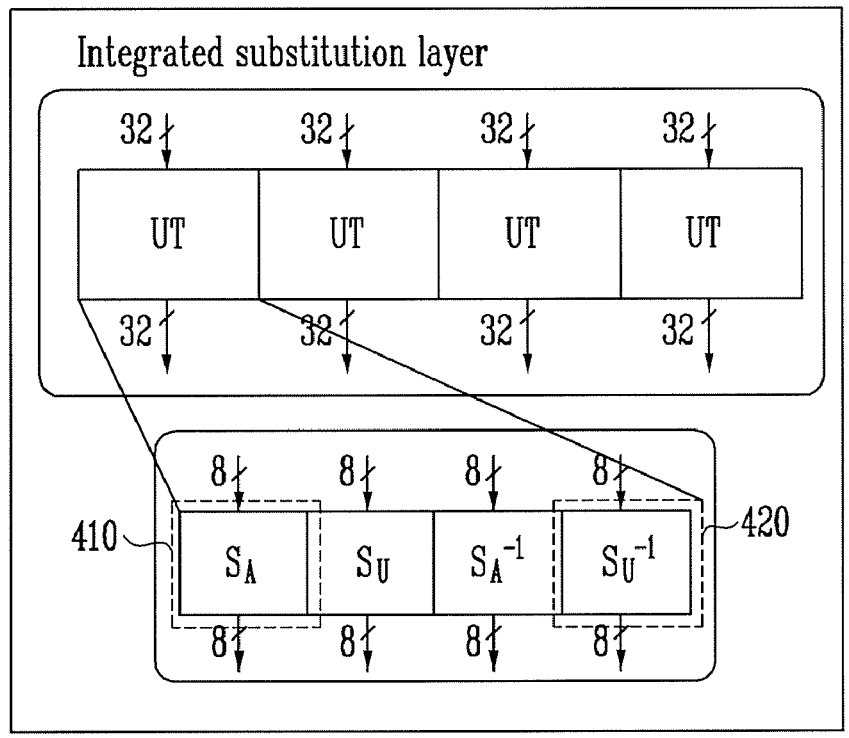
FIG. 4 is a block diagram of an integrated substitution layer according to an exemplary embodiment of the present invention.

FIG. 4 is a block diagram of the integrated substitution layer 320. Referring to FIG. 4, the integrated substitution layer 320 comprises an $S_A$ (AES S-Box) 410 and an $S_U$ (Unified S-Box) 420. First, the $S_A$ 410, which is an S-box used in common for AES and ARIA algorithms, selectively performs $S^1$ and $S^{-1}$ functions as shown in Formula 1 below.

Figure 5:
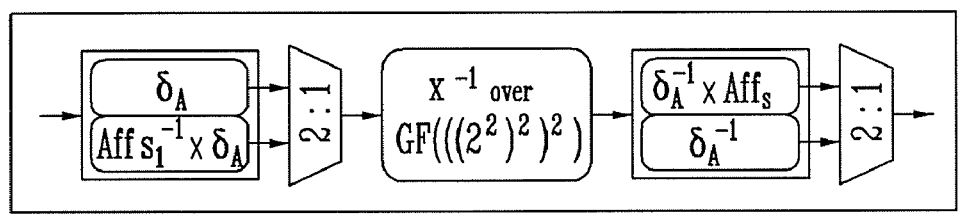
FIG. 5 illustrates operation of an $S_A$ S-box block according to an exemplary embodiment of the present invention.

FIG. 5 illustrates operation of the $S_A$. Here, $\delta_A$ is an isomorphism function that maps an 8-bit input in a finite field $GF(2^8)$ onto an element in a $GF(((2^2)^2)^2)$, and $Aff_{S1}$ is an affine transformation function shown in Formula 1 below. In addition, $Aff_{S1}^{-1}*\delta_A$ and $\delta_A^{-1}*Aff_{S1}$ are combined functions of $\delta_A$ and the affine transformation function. Such an $S_A$ performs the same function as an S-box used in the AES algorithm, and thus a detailed description thereof will be omitted.

$$S_1(x) = A \cdot x^{-1} \oplus b \quad \text{[Formula 1]}$$

$$= \begin{pmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{pmatrix} \cdot x^{-1} \oplus \begin{pmatrix} 1 \\ 1 \\ 0 \\ 0 \\ 0 \\ 1 \\ 1 \\ 0 \end{pmatrix}$$

$$S_1^{-1}(x) = (A^{-1} \cdot (x \oplus b))^{-1}$$
$$= (A^{-1} \cdot x \oplus A^{-1} \cdot b)^{-1}$$
$$= \left[ \begin{pmatrix} 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \\ 0 & 1 & 0 & 1 & 0 & 0 & 1 & 0 \\ 0 & 0 & 1 & 0 & 1 & 0 & 0 & 1 \\ 1 & 0 & 0 & 0 & 0 & 1 & 0 & 0 \\ 0 & 1 & 0 & 1 & 1 & 0 & 1 & 0 \end{pmatrix} \cdot x \oplus \begin{pmatrix} 1 \\ 0 \\ 1 \\ 0 \\ 0 \\ 1 \\ 0 \\ 0 \end{pmatrix} \right]^{-1}$$

Figure 6:
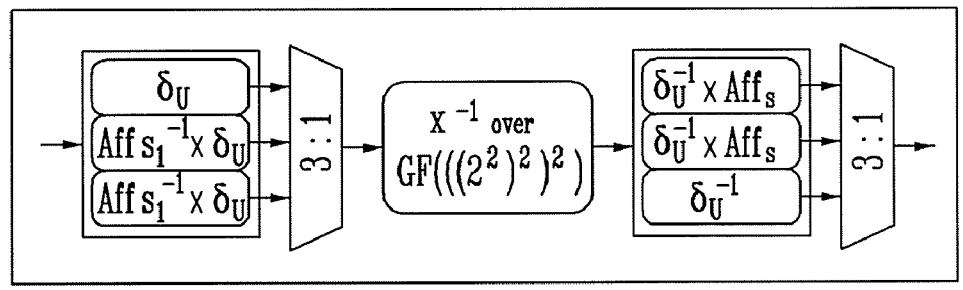
FIG. 6 illustrates operation of an Su S-box block according to an exemplary embodiment of the present invention.

Meanwhile, the $S_U$ selectively performs 4 functions of $S_1$, $S_1^{-1}$, $S_2$ and $S_2^{-1}$. Here, $S_2$ uses $x^{247}$ instead of $x^{-1}$. With respect to an element x in a $GF(2^8)$, $x^{2^i}$ ("i" is an integer) may be calculated to be $M_i*x$ using an appropriate 8×8 binary non-singular matrix $M_i$. Therefore, the functions $S_2$ and $S_2^{-1}$ can be arranged as shown in Formula 2 below. FIG. 6 illustrates operation of the $S_U$. Here, $\delta_U$ is an isomorphism function, and $Aff_{S2}$ is an affine transformation function shown in Formula 2 below. Here, in order to optimize hardware area, all available isomorphism functions $\delta_U$ are examined, thereby determining the isomorphism function $\delta_U$ having the smallest number of "1" in an 8×8 binary matrix used in each of 6 functions of $\delta_U$, $\delta_U^{-1}$, $Aff_{S1}^{-1}*\delta_U$, $\delta_U^{-1}*Aff_{S1}$, $Aff_{S2}^{-1}*\delta_U$ and $\delta_U^{-1}*Aff_{S2}$, and calculating other functions using the determined isomorphism function $\delta_U$.

$$S_2(x) = C \cdot x^{247} \oplus d \quad \text{[Formula 2]}$$
$$= C \cdot x^{-8} \oplus d$$
$$= C \cdot (x^{-1})^8 \oplus d$$
$$= C \cdot M_3 \cdot (x^{-1}) \oplus d$$
$$= \begin{pmatrix} 0 & 1 & 0 & 1 & 0 & 1 & 1 & 1 \\ 0 & 0 & 1 & 1 & 1 & 1 & 1 & 1 \\ 1 & 1 & 1 & 0 & 1 & 1 & 0 & 1 \\ 1 & 1 & 0 & 0 & 0 & 0 & 1 & 1 \\ 0 & 1 & 0 & 0 & 0 & 0 & 1 & 1 \\ 1 & 1 & 0 & 0 & 1 & 1 & 1 & 0 \\ 0 & 1 & 1 & 0 & 0 & 0 & 1 & 1 \\ 1 & 1 & 1 & 1 & 0 & 1 & 1 & 0 \end{pmatrix} \cdot x^{-1} \oplus \begin{pmatrix} 0 \\ 1 \\ 0 \\ 0 \\ 0 \\ 1 \\ 1 \\ 1 \end{pmatrix}$$

$$(S_2^{-1}(x))^{-8} = C^{-1} \cdot (x \oplus d)$$
$$\therefore S_2^{-1}(x) = (C^{-1} \cdot (x \oplus d))^{-32}$$
$$= ((C^{-1} \cdot (x \oplus d)^{32})^{-1}$$
$$= (M_5 \cdot C^{-1} \cdot (x \oplus d))^{-1}$$
$$= (M_5 \cdot C^{-1} \cdot x \oplus M_5 \cdot C^{-1} \cdot d))^{-1}$$
$$= (F \cdot x \oplus F \cdot d)^{-1}$$
$$= \left[ \begin{pmatrix} 0 & 0 & 0 & 1 & 1 & 0 & 0 & 0 \\ 0 & 0 & 1 & 0 & 0 & 1 & 1 & 0 \\ 0 & 0 & 0 & 0 & 1 & 0 & 1 & 0 \\ 1 & 1 & 1 & 0 & 0 & 0 & 1 & 1 \\ 1 & 1 & 1 & 0 & 1 & 1 & 0 & 0 \\ 0 & 1 & 1 & 0 & 1 & 0 & 1 & 1 \\ 1 & 0 & 1 & 1 & 1 & 1 & 0 & 1 \\ 1 & 0 & 0 & 1 & 0 & 0 & 1 & 1 \end{pmatrix} \cdot x \oplus \begin{pmatrix} 0 \\ 0 \\ 1 \\ 1 \\ 0 \\ 1 \\ 0 \\ 0 \end{pmatrix} \right]^{-1}$$

An AES diffusion layer performs a MixColumns operation and an InvMixColumns operation upon encryption and decryption, respectively. Such an AES diffusion layer performs matrix multiplication in units of 32-bit data. On the other hand, an ARIA diffusion layer performs 16×16 binary matrix multiplication on the entire 128-bit data in units of 1 byte. The arithmetic method and apparatus according to an exemplary embodiment of the present invention have an AES and ARIA-integrated diffusion layer that extracts the common terms used in the AES and ARIA diffusion layers and operates in units of 128 bits.

First, in the AES algorithm, 128-bit values $[Y_0, Y_1, Y_2, Y_3]$ resulting from the MixColumns operation on 128-bit input $[X_0, X_1, X_2, X_3]$ may be calculated as shown in Formula 3 below. Here, $X_i$ and $Y_i$ denote 32-bit unit data.

$$\begin{pmatrix} Y_0 \\ Y_1 \\ Y_2 \\ Y_3 \end{pmatrix} = \begin{pmatrix} M_0 & 0 & 0 & 0 \\ 0 & M_0 & 0 & 0 \\ 0 & 0 & M_0 & 0 \\ 0 & 0 & 0 & M_0 \end{pmatrix} \cdot \begin{pmatrix} X_0 \\ X_1 \\ X_2 \\ X_3 \end{pmatrix} \quad \text{[Formula 3]}$$

$$= \begin{pmatrix} M_0' & 0 & 0 & 0 \\ 0 & M_0' & 0 & 0 \\ 0 & 0 & M_0' & 0 \\ 0 & 0 & 0 & M_0' \end{pmatrix} \cdot \begin{pmatrix} X_0 \\ X_1 \\ X_2 \\ X_3 \end{pmatrix} +$$

$$\begin{pmatrix} M_0'' & 0 & 0 & 0 \\ 0 & M_0'' & 0 & 0 \\ 0 & 0 & M_0'' & 0 \\ 0 & 0 & 0 & M_0'' \end{pmatrix} \cdot \begin{pmatrix} X_0 \\ X_1 \\ X_2 \\ X_3 \end{pmatrix}$$

Here, 4×4 matrices $M_0$, $M_0'$ and $M_0''$ are as shown below.

$$M_0 = \begin{pmatrix} 2 & 3 & 1 & 1 \\ 1 & 2 & 3 & 1 \\ 1 & 1 & 2 & 3 \\ 3 & 1 & 1 & 2 \end{pmatrix}, M_0' = \begin{pmatrix} 2 & 2 & 0 & 0 \\ 0 & 2 & 2 & 0 \\ 0 & 0 & 2 & 2 \\ 2 & 0 & 0 & 2 \end{pmatrix}, M_0'' = \begin{pmatrix} 0 & 1 & 1 & 1 \\ 1 & 0 & 1 & 1 \\ 1 & 1 & 0 & 1 \\ 1 & 1 & 1 & 0 \end{pmatrix}$$

In the same way, 128-bit values [$Z_0$, $Z_1$, $Z_2$, $Z_3$] resulting from the InvMixColumns operation are calculated as shown in Formula 4 below. Here, $Z_i$ denotes 32-bit unit data.

$$\begin{pmatrix} Z_0 \\ Z_1 \\ Z_2 \\ Z_3 \end{pmatrix} = \begin{pmatrix} M_1 & 0 & 0 & 0 \\ 0 & M_1 & 0 & 0 \\ 0 & 0 & M_1 & 0 \\ 0 & 0 & 0 & M_1 \end{pmatrix} \cdot \begin{pmatrix} X_0 \\ X_1 \\ X_2 \\ X_3 \end{pmatrix} =$$ [Formula 4]

$$\begin{pmatrix} M_1' & 0 & 0 & 0 \\ 0 & M_1' & 0 & 0 \\ 0 & 0 & M_1' & 0 \\ 0 & 0 & 0 & M_1' \end{pmatrix} \cdot \begin{pmatrix} X_0 \\ X_1 \\ X_2 \\ X_3 \end{pmatrix} + \begin{pmatrix} M_1'' & 0 & 0 & 0 \\ 0 & M_1'' & 0 & 0 \\ 0 & 0 & M_1'' & 0 \\ 0 & 0 & 0 & M_1'' \end{pmatrix} \cdot$$

$$\begin{pmatrix} X_0 \\ X_1 \\ X_2 \\ X_3 \end{pmatrix} + \begin{pmatrix} M_0 & 0 & 0 & 0 \\ 0 & M_0 & 0 & 0 \\ 0 & 0 & M_0 & 0 \\ 0 & 0 & 0 & M_0 \end{pmatrix} \cdot \begin{pmatrix} X_0 \\ X_1 \\ X_2 \\ X_3 \end{pmatrix}$$

Here, 4×4 matrices $M_1$, $M_1'$ and $M_1''$ are as shown below.

$$M_1 = \begin{pmatrix} E & B & D & 9 \\ 9 & E & B & D \\ D & 9 & E & B \\ B & D & 9 & E \end{pmatrix}, M_1' = \begin{pmatrix} 8 & 8 & 8 & 8 \\ 8 & 8 & 8 & 8 \\ 8 & 8 & 8 & 8 \\ 8 & 8 & 8 & 8 \end{pmatrix}, M_1'' = \begin{pmatrix} 4 & 0 & 4 & 0 \\ 0 & 4 & 0 & 4 \\ 4 & 0 & 4 & 0 \\ 0 & 4 & 0 & 4 \end{pmatrix}$$

Meanwhile, in the ARIA algorithm, 128-bit values [$w_0$, $w_1$, $w_2$, $w_3$, $w_4$, $w_5$, $w_6$, $w_7$, $w_8$, $w_9$, $w_{10}$, $w_{11}$, $w_{12}$, $w_{13}$, $w_{14}$, $w_{15}$] resulting from a diffusion operation on 128-bit input [$x_0$, $x_1$, $x_2$, $x_3$, $x_4$, $x_5$, $x_6$, $x_7$, $x_8$, $x_9$, $x_{10}$, $x_{11}$, $x_{12}$, $x_{13}$, $x_{14}$, $x_{15}$] may be calculated as shown in Formula 5 below. In Formula 5, $w_i$ and $x_i$ denote 8-bit unit data. Formula 5 can be arranged as shown in Formula 6 below by a 32-bitwise operation. In Formula 6, $W_i$ and $X_i$ denote 32-bit unit data.

$$\begin{pmatrix} w_0 \\ w_1 \\ w_2 \\ w_3 \\ w_4 \\ w_5 \\ w_6 \\ w_7 \\ w_8 \\ w_9 \\ w_{10} \\ w_{11} \\ w_{12} \\ w_{13} \\ w_{14} \\ w_{15} \end{pmatrix} = \begin{pmatrix} 0 & 0 & 0 & 1 & 1 & 0 & 1 & 0 & 1 & 1 & 0 & 0 & 0 & 1 & 1 & 0 \\ 0 & 0 & 1 & 0 & 0 & 1 & 0 & 1 & 1 & 1 & 0 & 0 & 1 & 0 & 0 & 1 \\ 0 & 1 & 0 & 0 & 1 & 0 & 1 & 0 & 0 & 0 & 1 & 1 & 1 & 0 & 0 & 1 \\ 1 & 0 & 0 & 0 & 0 & 1 & 0 & 1 & 0 & 0 & 1 & 1 & 0 & 1 & 1 & 0 \\ 1 & 0 & 1 & 0 & 0 & 1 & 0 & 0 & 1 & 0 & 0 & 1 & 0 & 0 & 1 & 1 \\ 0 & 1 & 0 & 1 & 1 & 0 & 0 & 0 & 0 & 1 & 1 & 0 & 0 & 0 & 1 & 1 \\ 1 & 0 & 1 & 0 & 0 & 0 & 0 & 1 & 0 & 1 & 1 & 0 & 1 & 1 & 0 & 0 \\ 0 & 1 & 0 & 1 & 0 & 0 & 1 & 0 & 1 & 0 & 0 & 1 & 1 & 1 & 0 & 0 \\ 1 & 1 & 0 & 0 & 1 & 0 & 0 & 1 & 0 & 0 & 1 & 0 & 0 & 1 & 0 & 1 \\ 1 & 1 & 0 & 0 & 0 & 1 & 1 & 0 & 0 & 0 & 0 & 1 & 1 & 0 & 1 & 0 \\ 0 & 0 & 1 & 1 & 0 & 1 & 1 & 0 & 1 & 0 & 0 & 0 & 0 & 1 & 0 & 1 \\ 0 & 0 & 1 & 1 & 1 & 0 & 0 & 1 & 0 & 1 & 0 & 0 & 1 & 0 & 1 & 0 \\ 0 & 1 & 1 & 0 & 0 & 0 & 1 & 1 & 0 & 1 & 0 & 1 & 1 & 0 & 0 & 0 \\ 1 & 0 & 0 & 1 & 0 & 0 & 1 & 1 & 1 & 0 & 1 & 0 & 0 & 1 & 0 & 0 \\ 1 & 0 & 0 & 1 & 1 & 1 & 0 & 0 & 0 & 1 & 0 & 1 & 0 & 0 & 1 & 0 \\ 0 & 1 & 1 & 0 & 1 & 1 & 0 & 0 & 1 & 0 & 1 & 0 & 0 & 0 & 0 & 1 \end{pmatrix} \cdot \begin{pmatrix} x_0 \\ x_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \end{pmatrix}$$ [Formula 5]

$$\begin{pmatrix} W_0 \\ W_1 \\ W_2 \\ W_3 \end{pmatrix} = \begin{pmatrix} M_2 & M_3 & M_4 & M_5 \\ M_3 & M_6 & \overline{M_5} & \overline{M_4} \\ M_4 & \overline{M_5} & M_7 & \overline{M_3} \\ M_5 & \overline{M_4} & \overline{M_3} & M_8 \end{pmatrix} \cdot \begin{pmatrix} X_0 \\ X_1 \\ X_2 \\ X_3 \end{pmatrix}$$ [Formula 6]

Here, 4×4 matrices $M_2$, $M_3$, $M_4$, $M_5$, $M_6$, $M_7$ and $M_8$ are as shown below. In Formula 6, $\overline{M_3}$, $\overline{M_4}$ and $\overline{M_5}$ are matrices consisting of bit-specific inverse elements of their original matrices.

$$M_2 = \begin{pmatrix} 0 & 0 & 0 & 1 \\ 0 & 0 & 1 & 0 \\ 0 & 1 & 0 & 0 \\ 1 & 0 & 0 & 0 \end{pmatrix}, M_3 = \begin{pmatrix} 1 & 0 & 1 & 0 \\ 0 & 1 & 0 & 1 \\ 1 & 0 & 1 & 0 \\ 0 & 1 & 0 & 1 \end{pmatrix}, M_4 = \begin{pmatrix} 1 & 1 & 0 & 0 \\ 1 & 1 & 0 & 0 \\ 0 & 0 & 1 & 1 \\ 0 & 0 & 1 & 1 \end{pmatrix},$$

$$M_5 = \begin{pmatrix} 0 & 1 & 1 & 0 \\ 1 & 0 & 0 & 1 \\ 1 & 0 & 0 & 1 \\ 0 & 1 & 1 & 0 \end{pmatrix}, M_6 = \begin{pmatrix} 0 & 1 & 0 & 0 \\ 1 & 0 & 0 & 0 \\ 0 & 0 & 0 & 1 \\ 0 & 0 & 1 & 0 \end{pmatrix}, M_7 = \begin{pmatrix} 0 & 0 & 1 & 0 \\ 0 & 0 & 0 & 1 \\ 1 & 0 & 0 & 0 \\ 0 & 1 & 0 & 0 \end{pmatrix},$$

$$M_8 = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

Therefore, 128-bit values $[y_0, y_1, \ldots, y_{15}]$ resulting from the MixColumns operation and 128-bit values $[z_0, z_1, \ldots, z_{15}]$ resulting from the InvMixColumns operation on the 128-bit input $[x_0, x_1, \ldots, x_{15}]$ according to the AES algorithm and the values $[w_0, w_1, \ldots, w_{15}]$ resulting from the diffusion operation according to the ARIA algorithm may be calculated as shown in Formula 7 below using the common terms.

$$\begin{cases} y_0 = 2A_0 + A_2 + x_1, y_1 = 2A_1 + A_3 + x_2, \\ y_2 = 2A_2 + A_0 + x_3, y_3 = 2A_3 + A_1 + x_0, \\ y_4 = 2A_4 + A_6 + x_5, y_5 = 2A_5 + A_7 + x_6, \\ y_6 = 2A_6 + A_4 + x_7, y_7 = 2A_7 + A_5 + x_4, \\ y_8 = 2A_8 + A_{10} + x_9, y_9 = 2A_9 + A_{11} + x_{10}, \\ y_{10} = 2A_{10} + A_8 + x_{11}, y_{11} = 2A_{11} + A_9 + x_8, \\ y_{12} = 2A_{12} + A_{14} + x_{13}, y_{13} = 2A_{13} + A_{15} + x_{14}, \\ y_{14} = 2A_{14} + A_{12} + x_{15}, y_{15} = 2A_{15} + A_{13} + x_{12} \end{cases}$$ [Formula 7]

$$\begin{cases} z_0 = E_0 + y_0, z_1 = E_1 + y_1, z_2 = E_2 + y_2, \\ z_3 = E_3 + y_3, z_4 = E_2 + y_4, z_5 = E_3 + y_5, \\ z_6 = E_2 + y_6, z_7 = E_3 + y_7, z_8 = E_4 + y_8, \\ z_9 = E_5 + y_9, z_{10} = E_4 + y_{10}, z_{11} = E_5 + y_{11}, \\ z_{12} = E_6 + y_{12}, z_{13} = E_7 + y_{13}, z_{14} = E_6 + y_{14}, \\ z_{15} = E_7 + y_{15} \end{cases}$$

$$\begin{cases} w_0 = x_3 + B_2 + A_8 + A_{13}, w_1 = x_2 + B_3 + A_8 + A_{15}, \\ w_2 = x_1 + B_2 + A_{10} + A_{15}, w_3 = x_0 + B_3 + A_{10} + A_{13}, \\ w_4 = B_0 + x_5 + A_{11} + A_{14}, w_5 = B_1 + x_4 x_4 + A_9 + A_{14}, \\ w_6 = B_0 + x_7 + A_9 + A_{12}, w_7 = B_1 + x_6 + A_{11} + A_{12}, \\ w_8 = A_0 + A_7 + x_{10} + B_7, w_9 = A_0 + A_5 + x_{11} + B_6, \\ w_{10} = A_2 + A_5 + x_8 + B_7, w_{11} = A_2 + A_7 + x_9 + B_6, \\ w_{12} = A_1 + A_6 + B_5 + x_{12}, w_{13} = A_3 + A_6 + B_4 + x_{13}, \\ w_{14} = A_3 + A_4 + B_5 + x_{14}, w_{15} = A_1 + A_4 + B_4 + x_{15} \end{cases}$$

The above used middle terms $A_i$, $B_i$, $C_i$, $D_i$ and $E_i$ are as shown below.

$$\begin{cases} A_0 = x_0 + x_1, A_1 = x_1 + x_2, A_2 = x_2 + x_3, A_3 = x_3 + x_0, \\ A_4 = x_4 + x_5, A_5 = x_5 + x_6, A_6 = x_6 + x_7, A_7 = x_7 + x_4, \\ A_8 = x_8 + x_9, A_9 = x_9 + x_{10}, A_{10} = x_{10} + x_{11}, A_{11} = x_{11} + x_8, \\ A_{12} = x_{12} + x_{13}, A_{13} = x_{13} + x_{14}, A_{14} = x_{14} + x_{15}, A_{15} = x_{15} + x_{12} \end{cases}$$

$$\begin{cases} B_0 = x_0 + x_2, B_1 = x_1 + x_3, \\ B_2 = x_4 + x_6, B_3 = x_5 + x_7, \\ B_4 = x_8 + x_{10}, B_5 = x_9 + x_{11}, \\ B_6 = x_{12} + x_{14}, B_7 = x_{13} + x_{15}, \end{cases} \begin{cases} C_0 = 4B_0, C_1 = 4B_1, \\ C_2 = 4B_2, C_3 = 4B_3, \\ C_4 = 4B_4, C_5 = 4B_5, \\ C_6 = 4B_6, C_7 = 4B_7 \end{cases}$$

$$\begin{cases} D_0 = 2(C_0 + C_1), \\ D_1 = 2(C_2 + C_3), \\ D_2 = 2(C_4 + C_5), \\ D_3 = 2(C_6 + C_7), \end{cases} \begin{cases} E_0 = D_0 + C_0, E_1 = D_0 + C_1, \\ E_2 = D_1 + C_2, E_3 = D_1 + C_3, \\ E_4 = D_2 + C_4, E_5 = D_2 + C_5, \\ E_6 = D_3 + C_6, E_7 = D_3 + C_7 \end{cases}$$

Figure 7:
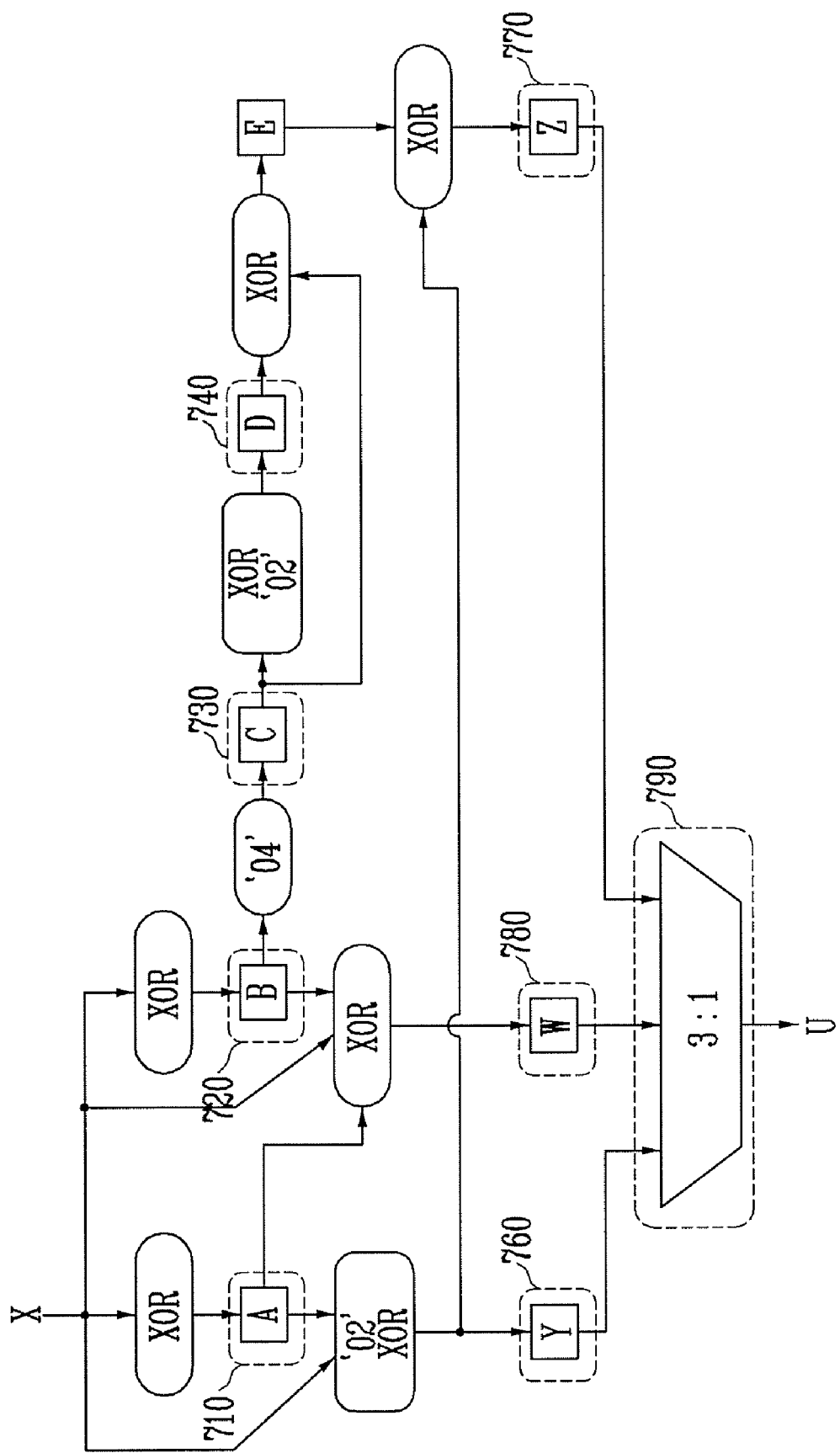
FIG. 7 is a block diagram of an integrated diffusion layer according to an exemplary embodiment of the present invention.

FIG. 7 is a block diagram of the integrated diffusion layer. Referring to FIG. 7, the integrated diffusion layer generates common terms A 710 and B 720 from a 128-bit input X, generates C 730, D 740 and E 750 from B 720, and generates a MixColumns result Y 760 and an InvMixColumns result Z 770 according to the AES algorithm and a diffusion result W 780 according to the ARIA algorithm from A 710, B 720 and E 750. Finally, a MUX 790 selectively selects a 128-bit result value U.

Thus far, the present invention has suggested an arithmetic method and apparatus for supporting efficient AES and ARIA encryption/decryption algorithms. The arithmetic method and apparatus minimize hardware area using an integrated substitution layer and an integrated diffusion layer while supporting both the AES and ARIA encryption/decryption functions. Therefore, the arithmetic method and apparatus can be efficiently used in smart cards, electronic passports, server-level encryption equipment, etc., requiring both the AES and ARIA encryption algorithms.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An integrated arithmetic apparatus for supporting Advanced Encryption Standard (AES) and Academy, Research Institute and Agency (ARIA) encryption and decryption functions, the apparatus comprising:
a key scheduler for generating a round key using an input key; and
a round function calculator for generating encrypted/decrypted data using input data and the round key,
wherein the round function calculator comprises an integrated substitution layer and an integrated diffusion layer configured to perform both AES and ARIA algorithms, wherein the integrated substitution layer comprises:
a first block for serving as an AES S-box; and
a second block for serving as an AES and ARIA S-box such that the second block uses an isomorphism function and an affine transformation function transforming an element of the second block into an element in a finite field $GF(((2^2)^2)^2)$, wherein the second block selects an isomorphism function having the smallest number of "1"s among the isomorphism function, the affine transformation function, and an combined function of the isomorphism function and the affine transformation function.

2. The integrated arithmetic apparatus of claim 1, wherein the integrated diffusion layer selectively uses one of an AES MixColumns function, an AES InvMixColumns function and an ARIA diffusion function.

3. The integrated arithmetic apparatus of claim 2, wherein the integrated diffusion layer shares the common terms of the AES MixColumns function, the AES InvMixColumns function and the ARIA diffusion function.

4. The integrated arithmetic apparatus of claim 1, wherein the key scheduler comprises an AES key scheduler block and an ARIA key scheduler block, and selects the round key among keys of the 2 blocks.

5. The integrated arithmetic apparatus of claim 4, wherein at least one of key storages of the ARIA key scheduler block is used as a key storage of the AES key scheduler block.

* * * * *